Feb. 21, 1928.    1,660,221
C. R. DIMM
MIXING AND CRUSHING MACHINE
Filed May 26, 1926    2 Sheets-Sheet 1

Inventor
Chandos R. Dimm
By
James L. Norris
Attorney

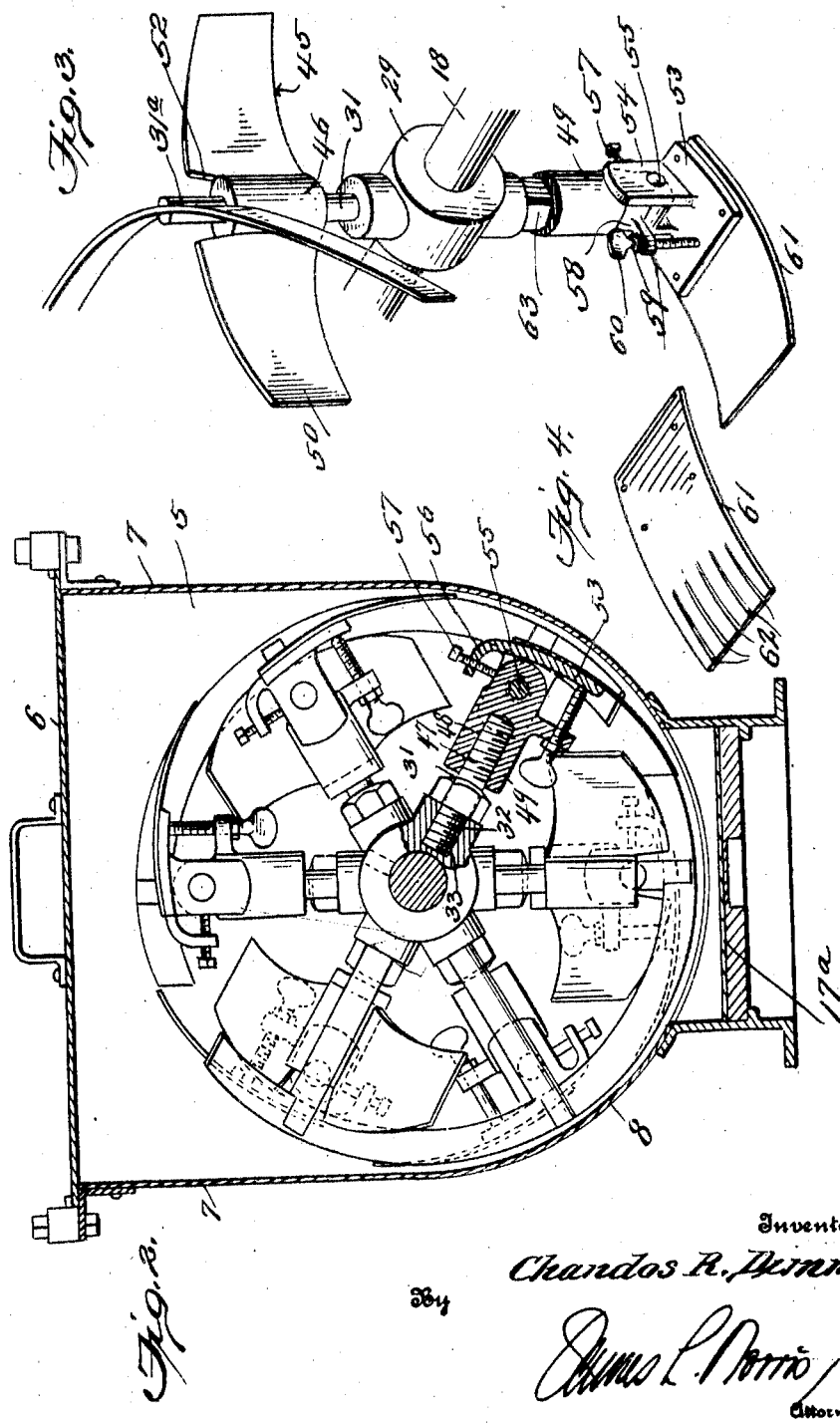

Patented Feb. 21, 1928.

1,660,221

UNITED STATES PATENT OFFICE.

CHANDOS ROY DIMM, OF MUNCY, PENNSYLVANIA, ASSIGNOR TO ROBINSON MANUFACTURING COMPANY, OF MUNCY, PENNSYLVANIA, A CORPORATION OF PENNSYLVANIA.

MIXING AND CRUSHING MACHINE.

Application filed May 26, 1926. Serial No. 111,809.

This invention relates to mixing machines adapted for effecting a practical commingling of various products.

The improved machine essentially comprises a mixing cylinder having intermediate inlet and discharge openings and revolving mechanism therein for thoroughly mixing the products introduced into the cylinder, and also moving the mixed products regularly towards the central discharge opening and at the same time reducing the products to pulverent condition through the medium of crushing elements associated with the revolving mechanism.

The present mixing machine is an improvement on the structure disclosed by my Patent No. 1,500,061, July 1, 1924, and the main advantage of this improved mixing machine, which embodies the same form of mixing cylinder, is the same as in the patented machine, or that a continuous circulation of the products introduced into the cylinder is effected as the products are carried from the center towards both ends of the cylinder and then back to the center and at the same time subjected to a crushing or reducing treatment. As in my patented structure, the operation of the mixing cylinder in the present improvement is that all of the products or ingredients enter at the center and each product or ingredient introduced and following another becomes thoroughly mixed with the product or products that have been previously admitted to the cylinder or machine.

A further advantage of the operation of the improved cylinder with the revolving mechanism including the crushing elements and having a central discharge opening or outlet, is that the products or ingredients that may be fed into the cylinder have the treatment thereof expedited by shortening the period of time necessary to carry or convey the mixed products to the central discharge opening in contradistinction to machines of this type heretofore constructed wherein the discharge opening or outlet is usually located at one end of the cylinder or mixing enclosure. The revolving mechanism with the crushing elements included in the present improved machine, relieves the latter of strain or undue resistance or hard running, as the contents of the cylinder are not required to be carried towards one end for the purposes of discharge, the pressure being equalized throughout the length of the mixing cylinder and permitting the machine to be run with considerably less power.

Specifically, the present improved construction comprises a novel arrangement of combined mixing and conveying devices in the mixing cylinder and particularly including both right and left-hand outer spiral ribbons which revolve and feed the products in the cylinder towards the central outlet or discharge, and paddles held inside of the ribbons and at such an incline as to revolve and carry the products towards the end of the cylinder in opposition to the operation of the right and left-hand spiral ribbons, and also rotating, crushing elements disposed at predetermined intervals throughout the operating mechanism within the cylinder and whereby a thorough commingling of the products is had and a reduction of the same through the pressure elements which in operating on some products will eliminate flake formations and lumps, and insure a thorough and uniform mixture of a fine powdery nature, and also produce a uniform color without streaks in treating products of different colors or shades.

The invention also consists in the general construction and arrangement of the several parts which will be more fully hereinafter described and claimed.

In the drawings:

Fig. 2 is a transverse vertical section on the line 2—2, Fig. 1, looking in the direction of the arrows.

Fig. 3 is a sectional perspective view of a portion of the mixing and conveying mechanism and one of the crushing elements which are disposed in the mixing cylinder or chamber.

Fig. 4 is a detail perspective view showing a slight modification in the form of the crushing shoe.

Figure 1:
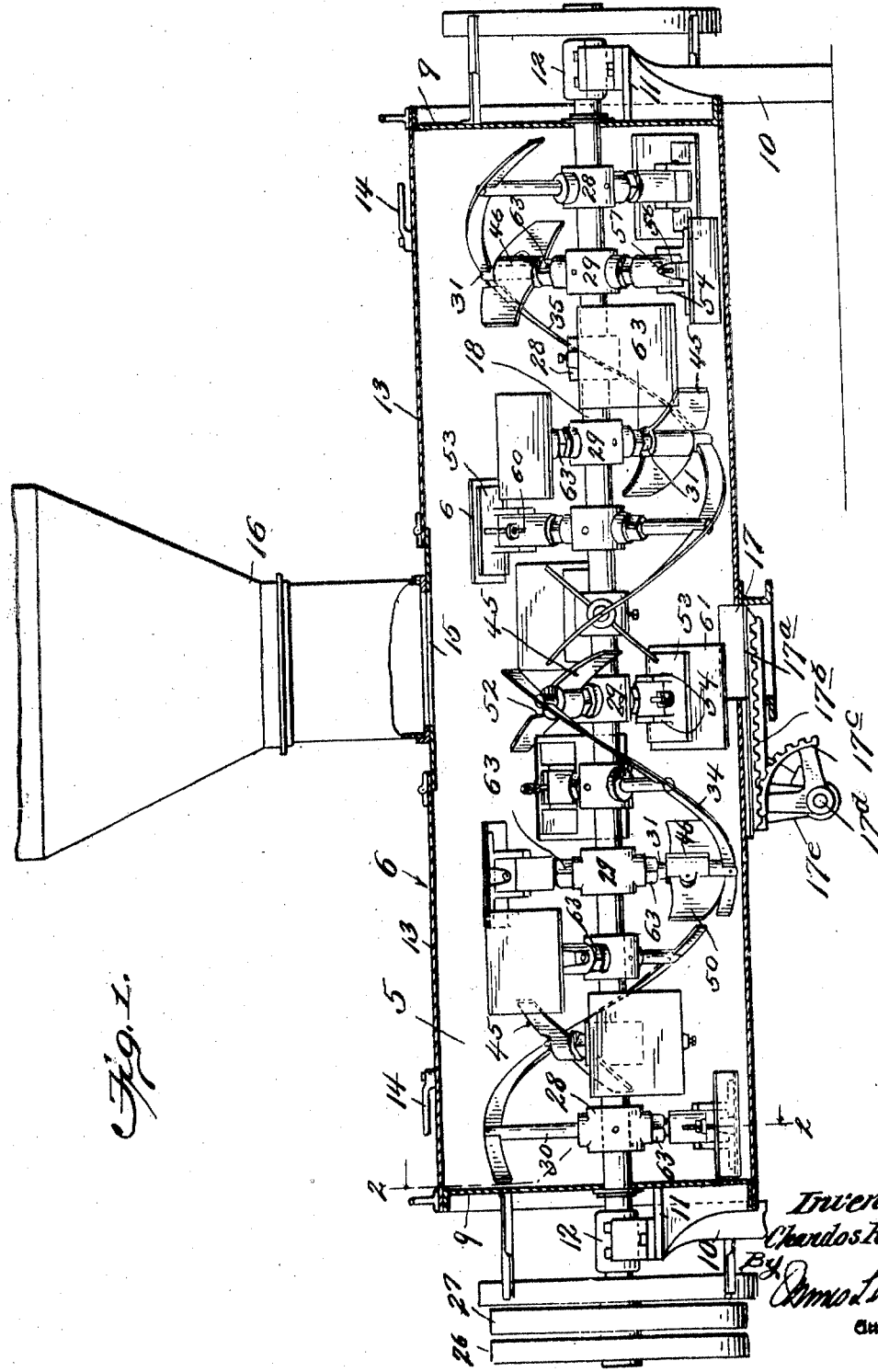
Fig. 1 is a longitudinal vertical section of a mixing machine embodying pulverizing or crushing elements comprising features of the present invention.

The numeral 5 designates a mixing cylinder or enclosure which is preferably of the contour in cross section shown by Fig.

2 and has a flat top 6 and partially vertical sides 7 which merge into a substantially semicircular bottom 8. The cylinder 5 is supported by end legs 10 with central supports 11 for bearings 12, which are located adjacent the ends 9. The flat top or cover 6 is constructed with hinged lid sections 13 at opposite sides of the transverse center thereof, these lid sections being normally held firmly closed by clamps 14, which may be of any preferred form and operable for readily releasing the lids to open the same and give access to the interior of the cylinder for any purpose found necessary. At an intermediate portion of the flat top or cover 6 is an inlet opening 15 having a supply 16 mounted thereover and forming the means in the present improved mixing machine for the introduction of products or substances to be treated and mixed in the cylinder, the completely treated products or substances being released from the cylinder through an intermediate bottom discharge or outlet opening 17 having a slide valve or gate 17$^a$ cooperating therewith and provided with a rack 17$^b$, which is engaged by a toothed segment 17$^c$, held on a shaft 17$^d$ mounted in a bracket 17$^e$. The shaft 17$^{d'}$ may be operated by any suitable means to open and close the slide valve or gate 17$^a$. The slide valve or gate 17$^a$ may be readily operated through the actuation of the shaft 17$^d$ and the toothed segment or sector 17$^e$. Extending longitudinally through the cylinder 5 is a shaft 18 which continues through the cylinder heads 9 and is mounted in the bearings 12, said shaft having suitable operating mechanism which may be similar to that disclosed by my above-mentioned patent, or any other preferred form.

A preferred and comparatively simplified form of the mixing machine embodying the features of the present invention includes the cylinder 5 and the operating mechanism comprising the shaft 18, which is operated regularly with such speed as may be desirable and necessary to effect a thorough circulation of the products or ingredients introduced into the cylinder 5 and to effectively commingle and crush such products or ingredients. On the shaft 18 at predetermined intervals hubs 28 and 29 are mounted and fixed to rotate with the said shaft, the said hubs being respectively provided with radially projecting arms or spokes 30 and 31, which have inner extremities 32 suitably secured to the said hubs, one practical means of securement being shown, and consisting of screw-threading the said inner extremity 32 to engage corresponding interiorly screw-threaded sockets 33 formed in the hubs. The spokes or arms 30 and 31 respectively project radially in opposite directions from the hubs 28 and 29. A ribbon or blade 34 is secured to the outer end of the spoke 30 of the first hub 28 to the left and then spirally directed and secured to the arm or spoke 31 of the next adjacent hub 29, and then to the succeeding spoke or arm 30 of the following hub 28, and so continue to an intermediate portion of the cylinder, where it terminates, a corresponding blade or ribbon 35 being spirally disposed and similarly attached to the spokes 30 and 31 projecting from the successive hubs 28 and 29 in the right-half of the interior portion of the cylinder 5 and likewise terminating at the central portion of the cylinder. The spiral blades or ribbons 34 and 35 are curved in reverse directions, or have a reverse feeding operation with respect to the two ends or heads 9 of the cylinder 5. Mounted on the spokes 31 to which the spiral blades 34 and 35 are secured are auxiliary blades 45, these latter blades being omitted from the spokes 30 of the hubs 28. The blades 45 are disposed at such angles as to effect a feeding action relatively to the contents of the cylinder 5, the said blades on opposite sides of the vertical center of the cylinder being in reverse positions, but all of the blades have an angular disposition across the longitudinal axis of the mixing mechanism or the shaft 18. In the present instance the hubs 29, which alternate with the hubs 28 on the shaft 18, carry the blades 45 through the arms of the said latter hubs in a manner substantially similar to the arrangement of the corresponding blades in my patent hereinbefore noted. Other means of securing these blades 45 to the arms of the hubs 28 may be adopted if desired. Each of the auxiliary blades 45 is in the form clearly shown on an enlarged scale by Fig. 3, and comprises a central hub 46, which is suitably clamped or held against movement on the arm 31 close to the ribbon or blade which passes through a slot 31$^a$ formed in the outer extremity of the spoke or arm 31. The wings of the blades 45 are flattened and longitudinally curved, as at 50, and radially extend from the hub 46 therefor, said flattened wings constituting the blades 45 being cut away or slotted at their outer portions to form a recess 52, for adapting the said blades to be closely applied relatively to the ribbon blades 34 and 35. The function of the blades 45 is to feed or tend to convey the products or ingredients in the mixing cylinder toward the opposite ends of the latter in opposition to the operation of the ribbon blades 34 and 35, to feed the said products or ingredients toward the center of the cylinder. The operation of the ribbon blades, however, is stronger or more forceful relatively to the products or ingredients in the cylinder 5 than the blades 45, and hence the products or ingredients are moved or conveyed by the ribbon blades to the central discharge outlet 17 in opposing directions from the portions of the cylinder on opposite sides of the discharge opening 17. However, the conveying effect of the blades 45 on the products or ingredients in the cylinder 5 is strong enough to result in a thorough circulation and blending of the contents of the cylinder, with obvious advantages in mixing operations.

The present improved structure, in addition to the spiral blades or ribbons 34 and 35 and the auxiliary blades 45, is equipped with crushing elements of a novel form and are mounted on the arms or spokes 30 and 31 of the hubs 28 and 29 opposite the arms or spokes to which the ribbons or spiral blades 34 and 35 are attached, and also in opposition to the mounting of the auxiliary blades 45. These crushing elements constitute the essential features of improvement in the present machine and are combined with the ribbon or spiral blades 34 and 35 and auxiliary blades 45 to perform an additional advantageous function without in the least interfering with the feed and movement of the products or substances operated upon within the cylinder 5. As particularly shown by Figs. 2 and 3, each arm or spoke 30 and 31 opposite that to which the ribbon or spiral blade is attached has its outer extremity screw-threaded, as at 47, for securement in a screw-threaded socket 48 at the inner portion of a radial leg 49, which has a foot 53 movably associated with the outer end thereof. Each foot 53 has a pair of inwardly projecting coupling arms 54 between which the outer free end of the leg 49 projects and is connected to said arms by a transverse pivot 55. The forward part of the foot has an inwardly extending terminal heel projection 56, in which is mounted a set screw 57, which normally bears against the adjacent portion of the free end of the leg 49. The leg 49 opposite the point of engagement therewith of the set screw 57 has an outwardly extending lug 58, in which is mounted a stop or set screw 59 having an inner head 60 that may be readily engaged for modifying the adjustment of the same, the outer free end of the screw 59 bearing against the central portion of the foot 53 in rear of the point of pivotal attachment of said foot to the leg 49. Secured to the outer side of the foot 53 and projecting beyond the latter in arcuate contour is a crusher shoe or blade 61, which is adjusted through the screw 57 in such manner as to prevent the shoe from lopping outwardly by centrifugal force as the shoe revolves through or over the top portion of the cylinder where there is no arcuate wall and during which time the rear free end of the shoe is not held in toward the center as it is when in operative engagement with the lower arcuate bottom portion of the cylinder. The adjusting screw 59 is for the purpose of regulating the pressure of the rear end of the shoe against the lower semicircular bottom 8 of the cylinder, to effectively mash or pulverize little lumps that may enter between the shoe and cylinder from the forward end of the shoe where there is a greater open space between the shoe and cylinder wall.

In treating different products or substances this control and regulation of each shoe 61 through the foot 53 thereof may be modified, and as shown in detail by Fig. 4, the free end of the shoe 61 may have diagonally disposed grooves 62 formed in the free extremity thereof and which lie next to the inner curved surface of the wall of the cylinder. This grooved structure at the free end of the blade is for the purpose of effectively operating in connection with lamp black and other substances that may be of a slightly greasy nature, and which are difficult to spread out in a smooth sheet without forming flakes, to break up the flakes into a fine powdery condition and at the same time spread the material treated in a smooth sheet. To hold the spokes 30 and 31 against accidental loosening movement relatively to the hubs to which they are secured, jam nuts 63 are provided and applied to such of the arms or spokes as may be necessary to effectively hold the same without variation of adjustment from a predetermined radial extent. As heretofore indicated, the arms or spokes 30 and 31 may be modified as to their radial projection relatively to the hubs 28 and 29 and the shaft 18 in treating various products or substances. It will also be seen that the crushing shoes 61 carried by the arms projecting from the respective hubs 28 and 29 have an edge overlapping disposition, this relative edge projection of the successive shoes being permitted without interference of operation, in view of the fact that the shoes are disposed in varying angular positions around the shaft 18. By means of this relative overlapping side edge disposition of the shoes 61, the interior surface of the wall of the cylinder 5, and particularly the lower arcuate wall, is engaged from end to end, and the products or substances introduced into the cylinder will thereby be operated upon in the manner desired and to effect a thorough pulverent condition as well as a thorough mixture. The products treated in the machine are thoroughly and evenly reduced and mixed, and the shoes will act to crush any lumps, dough-balls or the like that may be present therein, as, for instance, in the treatment of lamp black or other analogous products or substances that have a slightly greasy nature.

From the foregoing it will be seen that the mixing or blending mechanism and pulverizing or crushing elements within the cylinder 5 have a skeleton contour with relation to the shaft 18. The blades 45 by their respective angular disposition aid materially to the expeditious yet thorough commingling of the products or ingredients introduced into the cylinder 5. When desired or found necessary the angle of the blades 45 may be modified by loosening the supporting means therefor and afterwards re-setting said means, the arms or spokes 30 and 31 being rendered adjustable through their screw-threaded connections to permit setting of the blades 45 in different positions. When the mixing mechanism is adjusted to operate on any particular product or ingredient, it will be regularly and uniformly positioned, and the crushing elements will be primarily adjusted in accordance with the character of the products or ingredients operated upon to render these components symmetrical and equally effective throughout the whole length of the shaft.

The general operation of the improved mechanism as a whole is very simple and will be readily understood from the foregoing description. The products or ingredients introduced into the cylinder 5 solely by the inlet 16, will, after the shaft and mechanism have been started in motion, immediately set into circulation the introduced products or substances by the spiral ribbon blades 34 and 35 and the angularly disposed blades 45 and first be fed outwardly and then inwardly towards the center of the cylinder and be liberated through the discharge opening 17. It will be understood that when the products, ingredients or substances to be treated are introduced into the cylinder, the slide valve or gate 17ª will be closed, and after a proper or predetermined period of operation of the mixing mechanism, the said slide valve or gate will be opened to permit the treated products or ingredients to be fully discharged from the cylinder. During the mixing operation, the crushing shoes 61 will be effectively operated throughout the whole length of the cylinder 5 and simultaneously crush or pulverize and blend the products, ingredients or substances introduced into the cylinder.

What is claimed as new is:

1. In a mixing and crushing machine of the class specified, the combination with a cylinder with an inlet and a discharge both located at a distance from the cylinder ends, and rotating mixing mechanism comprising devices reversely positioned in opposite portions of the cylinder with open spaces at intervals between parts thereof and operable to uniformly convey the contents of the cylinder towards the opposite ends of the latter and also inwardly to said outlet from opposite ends of the cylinder, of crushing shoes disposed lengthwise of said shaft and in part in reverse positions to engage the inner surface of the wall of the cylinder and exposed to the inner surface of the wall of the cylinder through said open spaces.

2. In combination with a mixing and crushing machine, in a mixing cylinder having a centrally located inlet and an outlet in opposite portions thereof, and mixing mechanism in the cylinder comprising devices reversely disposed on opposite sides of the inlet and outlet with open spaces at intervals between parts thereof to produce a thorough mixture and for uniformly conveying the mixed contents of the cylinder to the discharge outlet from opposite ends of the cylinder, of crushing shoes disposed in part diametrically opposite a portion of said devices to have their free ends in close operating relation to the inner surface of the wall of the cylinder between the open spaces of said devices.

3. In a mixing machine, the combination with a mixing cylinder having an outlet and an inlet both located a distance from the cylinder ends, mixing mechanism rotatably mounted in the cylinder and comprising a longitudinal shaft having radial arms arranged alternately at right angles to one another and having parts of said mechanism secured thereto, the said mixing mechanism on opposite sides of the inlet and outlet of the cylinder having a reverse disposition and operable to uniformly convey the contents of the cylinder towards the opposite ends of the latter and also inwardly to said outlet, of crushing shoes carried by a part of the said radial arms and having free extremities arranged close to and in yielding contact with the inner surface of the cylinder wall to crush the material during the mixing operation thereof.

4. The combination with mechanism having a cylinder with an inlet and an outlet respectively located in the upper and lower portions thereof and mixing mechanism rotatably disposed in the cylinder and comprising devices which in part simultaneously operate to convey the material outwardly from an intermediate portion of the cylinder towards the ends of the latter to effect a thorough circulation of the material and the remaining part of said devices operating to simultaneously uniformly convey the mixed material inwardly towards the central outlet, the outwardly conveying parts of the mixing mechanism being overpowered by the remaining parts of the said mechanism to effect a conveyance of the material to the central outlet, of crushing blades also rotatably held within the cylinder and extending approximately the full length of the latter and in reverse positions and adjustable to modify their positions and pressures with relation to the inner surface of the cylinder wall.

5. In a mixing machine, the combination with a cylinder having an inlet and an outlet located at a distance from both ends of the cylinder, rotatable mixing mechanism in reverse positions on opposite sides of the center of the cylinder and a plurality of crushing shoes disposed at regular intervals longitudinally with respect to and between parts of said mixing mechanism.

6. In a mixing machine, the combination with a cylinder with an inlet and an outlet located a distance from both ends of the cylinder, and rotatable mixing mechanism in the cylinder of crushing components arranged at different angles with relation to the mixing mechanism throughout the length of the latter and also having the side portions thereof disposed in operable overlapping relation relatively to the inner surface of the wall of the cylinder.

7. In a mixing machine, the combination with a cylinder with an inlet and an outlet located a distance from both ends of the cylinder, and mixing mechanism rotatably mounted in the cylinder, of crushing elements disposed at varying angles throughout the length of and between portions of the mixing mechanism and consisting of longitudinally curved shoes which are disposed at an angle relatively to the inner surface of the wall of the cylinder, the free end of each shoe having its outer side provided with grooves, the shoes being in reverse positions in different parts of said cylinder.

8. In a mixing machine, the combination with a cylinder with an inlet and an outlet located a distance from both ends of the cylinder, and mixing mechanism rotatably mounted in the cylinder, of crushing elements disposed at varying angles throughout the length of and between portions of the mixing mechanism and consisting of longitudinally curved yielding shoes which are disposed at an angle relatively to the inner surface of the wall of the cylinder, the free end of each shoe having its outer side provided with angularly arranged grooves.

In testimony whereof I have hereunto set my hand.

CHANDOS ROY DIMM.